(12) United States Patent
Lee et al.

(10) Patent No.: US 12,478,212 B2
(45) Date of Patent: Nov. 25, 2025

(54) PORTABLE DIRECT-FIRED COOKER

(71) Applicant: FiberTech CO., LTD, Paju-si (KR)

(72) Inventors: Seyoung Lee, Seoul (KR); Jonghun Woo, Paju-si (KR); Daehee Kim, Paju-si (KR); Hyojong Gil, Paju-si (KR); Duckeuy Lee, Goyang-si (KR); Taekheon Lee, Goyang-si (KR)

(73) Assignee: FIBERTECH CO., LTD (KR)

( * ) Notice: Subject to any disclaimer, the term of this patent is extended or adjusted under 35 U.S.C. 154(b) by 470 days.

(21) Appl. No.: 17/925,312

(22) PCT Filed: May 11, 2021

(86) PCT No.: PCT/KR2021/005846
§ 371 (c)(1),
(2) Date: Nov. 14, 2022

(87) PCT Pub. No.: WO2021/230605
PCT Pub. Date: Nov. 18, 2021

(65) Prior Publication Data
US 2023/0233024 A1    Jul. 27, 2023

(30) Foreign Application Priority Data

May 12, 2020    (KR) .................... 10-2020-0056281

(51) Int. Cl.
*A47J 37/07*    (2006.01)
(52) U.S. Cl.
CPC ....... *A47J 37/0763* (2013.01); *A47J 37/0713* (2013.01); *A47J 37/0786* (2013.01); *A47J 2037/0795* (2013.01)

(58) Field of Classification Search
CPC .............. A47J 37/0763; A47J 37/0713; A47J 37/0786; A47J 2037/0795; A47J 37/0694;
(Continued)

(56) References Cited

FOREIGN PATENT DOCUMENTS

| GB | 682584 A | * | 11/1952 | .............. F16F 13/02 |
| KR | 20140146882 A | * | 12/2014 | .............. A47J 37/04 |

(Continued)

OTHER PUBLICATIONS

Machine Translation of KR 101963544 (Year: 2019).*
(Continued)

*Primary Examiner* — Steven B Mcallister
*Assistant Examiner* — Amy E Carter
(74) *Attorney, Agent, or Firm* — Renaissance IP Law Group LLP (57) ABSTRACT

Disclosed herein is a portable direct-fired cooker including a lower case supporting a roasting plate mounted at an upper portion thereof; an upper case spaced apart from the lower case and including a heater module emitting a flame ignited upon receiving gas toward the lower case; a lifting frame coupled to a lower surface of the roasting plate to support the roasting plate; and a lift unit lifting and lowering the lifting frame, wherein the portable direct-fired cooker further includes: a spring mounted on a bottom surface inside the lower case and elastically supporting the lifting frame. According to the present disclosure, it is possible to smoothly lift and lower a top-down portable direct-fired cooker and to stably maintain a state after the lifting and lowering operations.

7 Claims, 8 Drawing Sheets

(58) Field of Classification Search
CPC ............... A47J 37/0682; A47J 37/0688; A47J 2037/0617; A47J 37/0727; Y02A 40/928
USPC ............................................. 126/1 R, 25 A
See application file for complete search history.

(56) References Cited

FOREIGN PATENT DOCUMENTS

| KR | 20150116603 A | * | 10/2015 | ............ A47J 37/074 |
| KR | 101715572 B1 | * | 3/2017 | ............ A47J 37/067 |
| KR | 101963544 B1 | * | 3/2019 | .............. F24C 3/085 |
| KR | 101965101 B1 | * | 4/2019 | .............. F24C 3/085 |
| KR | 102092166 B1 | * | 3/2020 | .......... A47J 37/0727 |
| KR | 20200000836 U | * | 4/2020 | .......... A47J 37/0736 |

OTHER PUBLICATIONS

KR 20140146882 with Machine Translation (Year: 2014).*
KR 101965101 with Machine Translation (Year: 2019).*
KR 102092166 with Machine Translation (Year: 2020).*
KR-20200000836 with Machine Translation (Year: 2020).*
KR-20150116603 with Machine Translation (Year: 2015).*
KR-101715572 with Machine Translation (Year: 2017).*

* cited by examiner

PORTABLE DIRECT-FIRED COOKER

TECHNICAL FIELD

The present disclosure relates to a portable direct-fired cooker that is portable and easily bakes and heats a roasted material indoors and outdoors.

BACKGROUND ART

In general, cookers are devices for cooking a roasted material with heat, and are classified into a direct heating type using a flame of gas and charcoal and an indirect heating type using electricity according to a method of providing heat.

For example, in the case of a direct-fired cooker using charcoal among the direct heating types, it may be difficult to control a size of a flame, so the inside of a roasted material is not cooked properly while only the outside is burned and ash and soot scatter during combustion, and thus, as a solution, a direct-fired cooker using butane gas has been proposed.

That is, the direct-fired cooker using butane gas has the advantage of easy flame control, but in most cookers, flames are generated below a roasting plate on which meat is put, so that smoke or toxic gas occurs when juice or oil generated by the roasted material falls, and during roasting, the roasted material may be easily pressed to a roasting plate, which causes burning of the roasted material.

In order to solve the problems, a top-down type cooker in which a flame is generated from the top has been proposed, including the 'Portable direct-fired cooker' of Korean Patent Laid-Open No. 10-2012-0083169 (published on Jul. 25, 2012), the 'Table-mounted and portable direct-fired cooker and warmer' of Korean Patent Registration No. 10-1454356 (published on Oct. 23, 2014), the 'Two-way cooker with a roasting table elevating structure' of Korean Patent Laid-Open No. 10-2014-0146882 (published on Dec. 29, 2014) and Registration No. 10-1715572 (published on Mar. 22, 2017), etc.

These top-down cookers resolve the problems in which juice or oil generated by a roasted material falls to cause smoke and toxic gas and the roasted material is easily pressed to a roasting plate during roasting, and in order to resolve a problem of a long roasting time, which is a problem of the top-down roasters, a lift is installed so that a height of the roasting plate may be adjusted, but since the roasting plate is lifted and lowered in a state in which a weight of the roasted material is added to the roasting plate, lifting and lowering of the roasting plate may not be smooth.

In addition, since the roasting plate is lifted and lowered by the lift, it may be difficult to maintain the lifted roasting plate by its own weight in the lifted state or it may be unstable to maintain the lowered roasting plate in the lowered state due to a repulsive force, and in such a case, a high risk may occur.

The above information disclosed in this Background section is only for enhancement of understanding of the background of the invention, and therefore it may contain information that does not form the prior art that is already known in this country to a person of ordinary skill in the art.

RELATED ART DOCUMENT

Patent Document (Patent document 0001) Korean Patent Registration No. 10-1686379 (published on Dec. 13, 2016)

(Patent document 0002) Korean Patent Registration No. 10-1454356 (published on Oct. 23, 2014)

(Patent document 0003) Korean Patent Registration No. 10-1564624 (Notice on Nov. 2, 2015)

(Patent document 0004) Korean Patent Registration No. 10-1715572 (published on Mar. 22, 2017)

(Patent document 0005) Korean Patent Registration No. 10-1686379 (published on Dec. 13, 2016)

DISCLOSURE

Technical Problem

An aspect of the present disclosure is to provide a portable direct-fired cooker that enables smooth lifting and lowering operations of a top-down portable direct-fired cooker and stably maintaining a state after lifting and lowering operations.

Technical Solution

In an aspect, a portable direct-fired cooker includes: a lower case supporting a roasting plate mounted at an upper portion thereof; an upper case spaced apart from the lower case and including a heater module emitting a flame ignited upon receiving gas toward the lower case; a lifting frame coupled to a lower surface of the roasting plate to support the roasting plate; and a lift unit lifting and lowering the lifting frame, wherein the portable direct-fired cooker further includes: a spring mounted on an inner bottom surface of the lower case and elastically supporting the lifting frame.

The portable direct-fired cooker may further include a spring cover covering the spring.

In another aspect, a portable direct-fired cooker includes a lower case supporting a roasting plate mounted at an upper portion thereof; an upper case spaced apart from the lower case and including a heater module emitting a flame ignited upon receiving gas toward the lower case; a lifting frame coupled to a lower surface of the roasting plate to support the roasting plate; a lift unit lifting and lowering the lifting frame; a lifting guider coupled to front surfaces of the upper case and the lower case and having a guide groove formed in a longitudinal direction; a lifting fixing lever protruding laterally from an upper portion and having a rotation coupling portion penetrating through the guide groove; and a coupling unit penetrating through a front surface of the lifting frame and coupled to the rotation coupling portion of the lifting fixing lever.

Also, the lifting fixing lever may be rotatably coupled to the coupling unit.

In addition, the lifting fixing lever may have a fixing protrusion protruding laterally from a lower portion.

Here, the lifting fixing lever may be wider in a lower portion than in an upper portion.

The portable direct-fired cooker may further include: an oil tray accommodated in the lower case, having a protrusion in the shape of a rim formed on a front surface, and having a lowering fixing groove formed in the rim shape of the protrusion.

Thus, the fixing protrusion may be inserted into the lowering fixing groove in a state in which the lift unit is lowered.

Also, the fixing protrusion may be inserted into the guide groove of the lifting guider in a state in which the lift unit is lifted.

Also, the fixing protrusion may have a height increasing toward an end.

Furthermore, a stopper may protrude from the side of the fixing protrusion.

Advantageous Effects

According to the portable direct-fired cooker of the present disclosure, it is possible to smoothly lift and lower the top-down portable direct-fired cooker by the spring elastically supporting the lift.

Also, the roasting plate may be stably fixed in a lifted state or a lowered state by the lifting fixing lever, thereby ensuring safety.

BEST MODE

In order to fully understand the present disclosure, the operational advantages of the present disclosure, and the objects achieved by the practice of the present disclosure, reference should be made to the accompanying drawings illustrating embodiments of the present disclosure and the contents described in the accompanying drawings.

In describing embodiments of the present disclosure, well-known technologies or repetitive descriptions that may unnecessarily obscure the gist of the present disclosure may be reduced or omitted.

Figure 1:
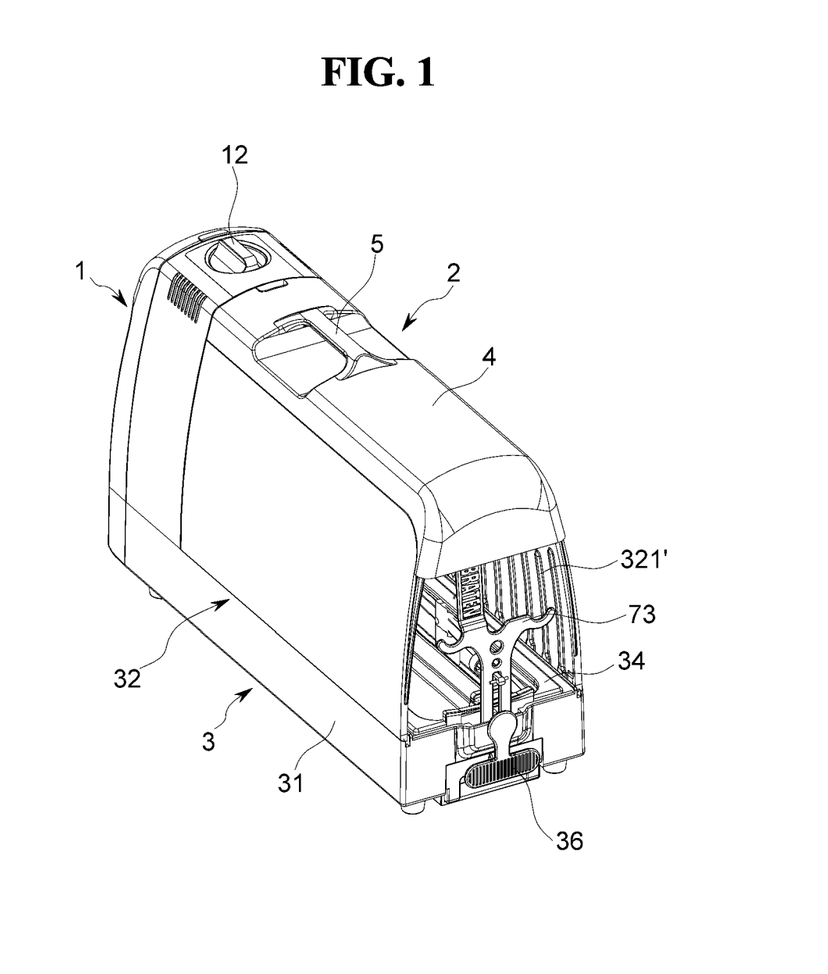
FIGS. 1 and 2 show a coupled and separated state of a portable direct-fired cooker of the present disclosure.
Figure 2:
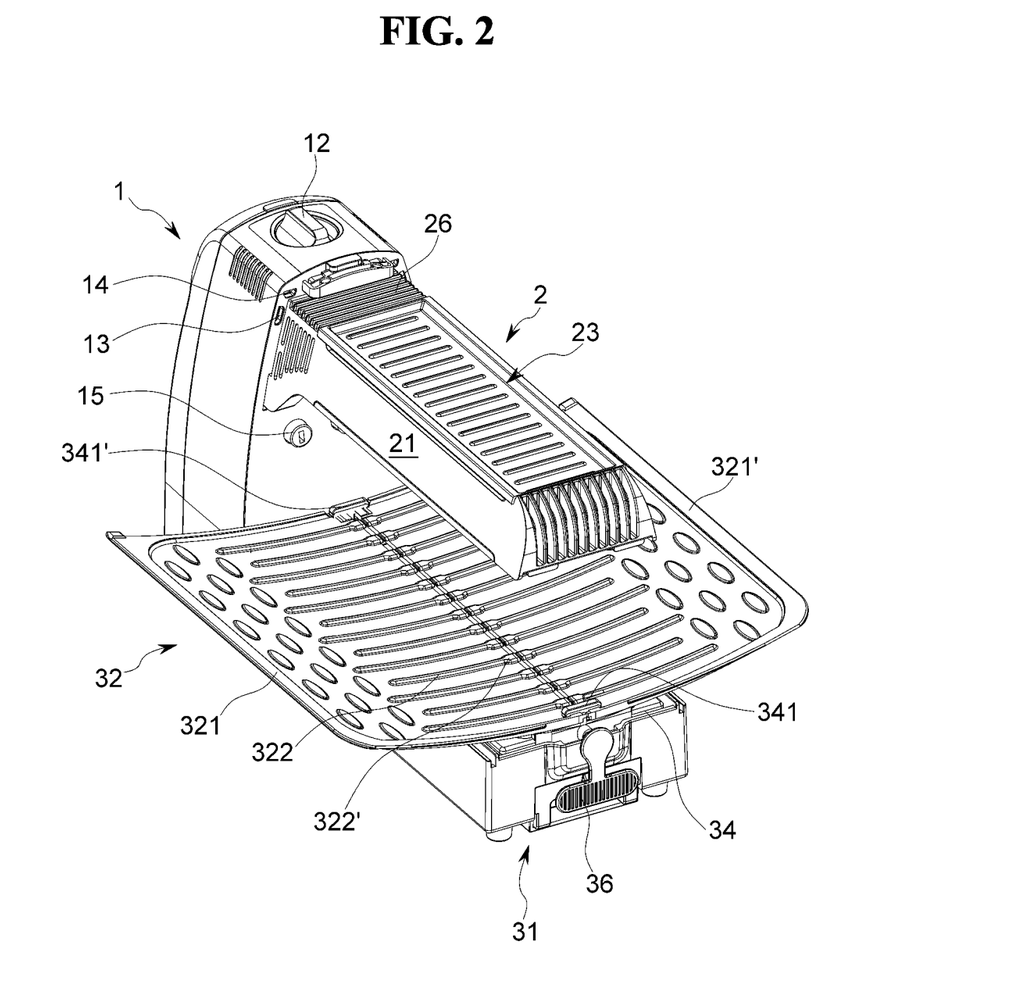
Figure 3:
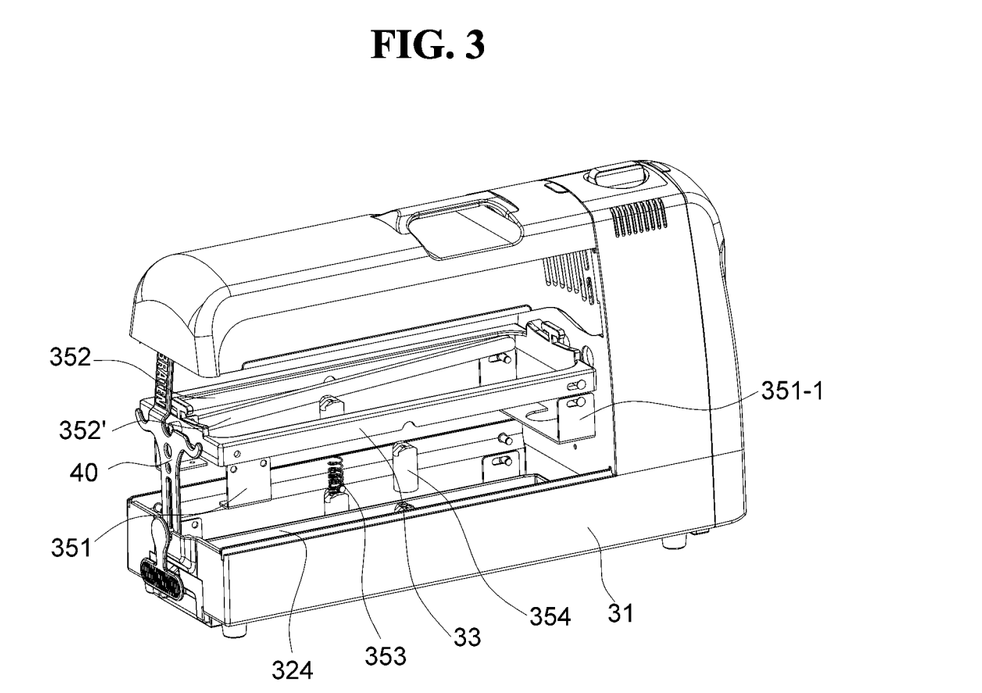
FIG. 3 is a partial view of a portable direct-fired cooker of the present disclosure.
Figure 4:
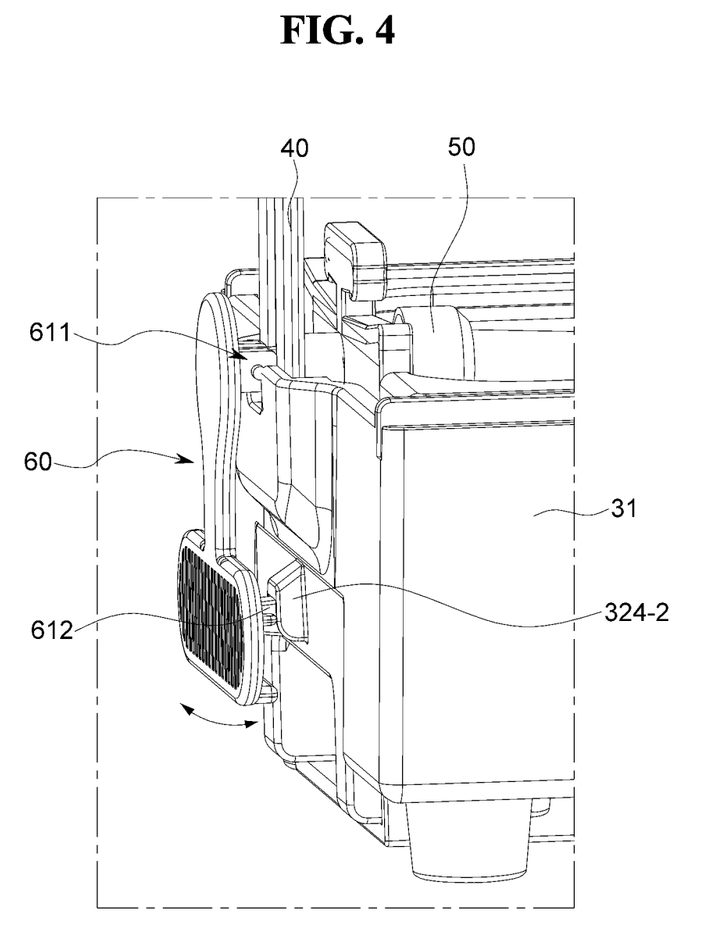
FIG. 4 is a partial view of a lowered state of a portable direct-fired cooker of the present disclosure.

FIGS. 1 and 2 show a coupled and separated state of a portable direct-fired cooker of the present disclosure, and FIG. 3 is a partial view of a portable direct-fired cooker of the present disclosure.

Hereinafter, a portable direct-fired cooker according to an embodiment of the present disclosure will be described with reference to FIGS. 1 to 3.

A portable direct-fired cooker of the present disclosure includes a gas supply unit 1 accommodating a butane gas container in an accommodation chamber formed at an upper portion of a rear end of a lower case 31 and discharging a butane gas through an adjustment valve 12, a flame unit 2 including a heater module downwardly emitting a flame heat generated by discharging and burning a butane gas that is discharged through the gas supply unit 1 to a lower side of the upper case 21 toward a lower case 31 of a roasting unit 3, a thermal insulation container 23 introduced to an open portion by opening the upper case 21 and mounted at an upper end of the heater module to heat a roasted material with naturally rising heat emitted by the heater module, a roasting plate 32 bisected into left and right plates 321 and 321', which include a plurality of ribs 322 protruding to discharge oil on an upper roasting surface to provide an oil drop space between protruding pieces 322' of the rib 322 portion in which the left and right plates 321 and 321' are in contact with each other so that the protruding piece 322' and a first fixing protrusion protruding from an upper end of a side surface of the left and right plates 321 and 321' are inserted into and coupled to a guide groove formed at both ends of an upper side of the lower case 31 and a first fixing hole 13 formed at an upper side of the gas supply unit 1 to serve as a horizontal cover, a lid 4 covering the thermal insulation container 23, and a handle 5 formed on the lid 4.

Also, the roasting plate 32 is fitted and coupled to the lifting frame 33, and the lifting frame 33 is lifted and lowered by the lift unit 35 to bring the roasted material closer to or separated from the heater module.

The lift unit 35 is fixed to the lower case 31 by support brackets 351 and 351' and includes a first link 352 and a second link 352' having one end mounted on a vertical surface at both sides of the support brackets 351 and 351' to be axially fixed and moved, and coupled to each other by a hinge shaft in the center, and the other end of the first link 352 and the second link 352' is axially fixed to and move on a vertical surface of the lifting frame 33.

Furthermore, in the present disclosure, an elastic spring 353 is mounted on the inner bottom surface of the lower case 31 so that the lifting frame 33 may be smoothly lifted and lowered by the lift unit 35.

The elastic spring 353 is preferably mounted on the lower case 31 at a point corresponding to an intersection of the first link 352 and the second link 352'.

Also, in order to prevent contamination by foreign substances caught in the elastic spring 353, a spring cover 354 protecting the elastic spring 353 is fitted and coupled to the elastic spring 353.

When the lifting frame 33 is lifted, the lifting frame 33 is supported by the lifting guider 40.

The lifting guider 40 is coupled to front surfaces of the upper case 21 and the lower case 31, and a guide groove 411 is formed in a vertical direction.

Also, a skewer holder recess 412 is formed at a middle portion to also serve as a skewer holder.

The lifting frame 33 is supported and fixed by the coupling unit 50 and a lifting fixing lever 60.

The coupling unit 50 passes through a front surface of the lifting frame 33 to be coupled with the lifting fixing lever 60, and a rotating coupling portion 611 protruding in a horizontal direction from an upper portion of the lifting fixing lever 60 is hinged to the coupling unit 50 through the guide groove 411 of the lifting guider 40

Accordingly, the lifting frame 33 is stably lifted and lowered within the range of the guide groove 411 of the lifting guider 40.

Figure 5:
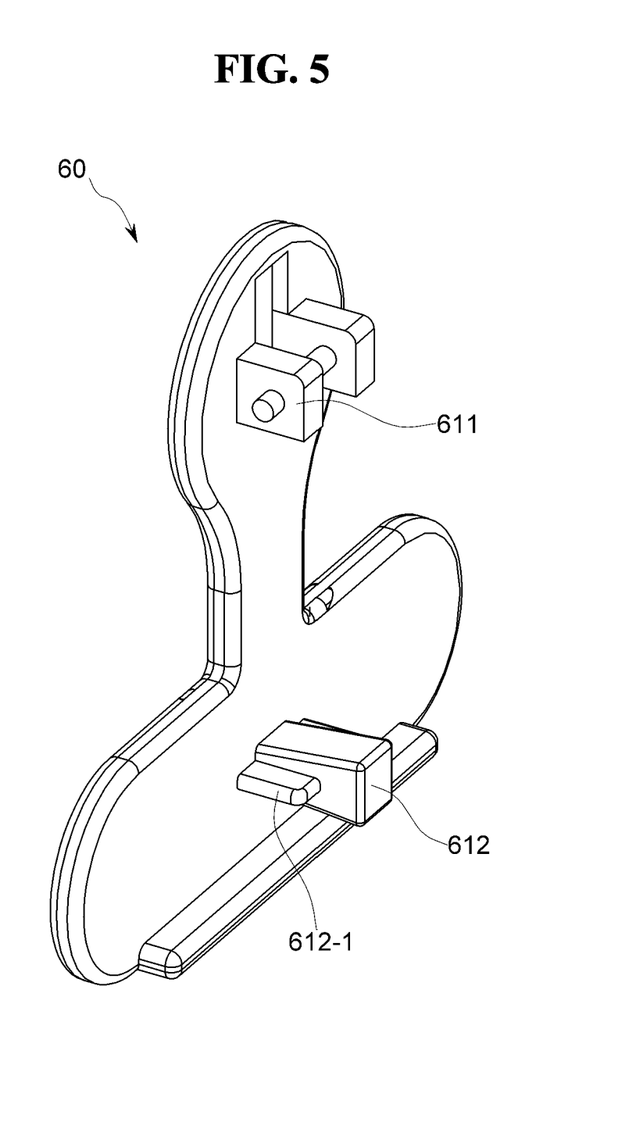
FIGS. 5 and 6 are views illustrating components of the present disclosure.

Furthermore, in the present disclosure, it is configured to maintain a maximally lifted or a maximally lowered state when the lifting frame 33 is lifted and lowered, and first, FIG. 5 shows a state in which the lifting frame 33 is lowered, and in the present disclosure, the lowered lifting frame 33 is prevented from being unintentionally lifted.

Figure 6:
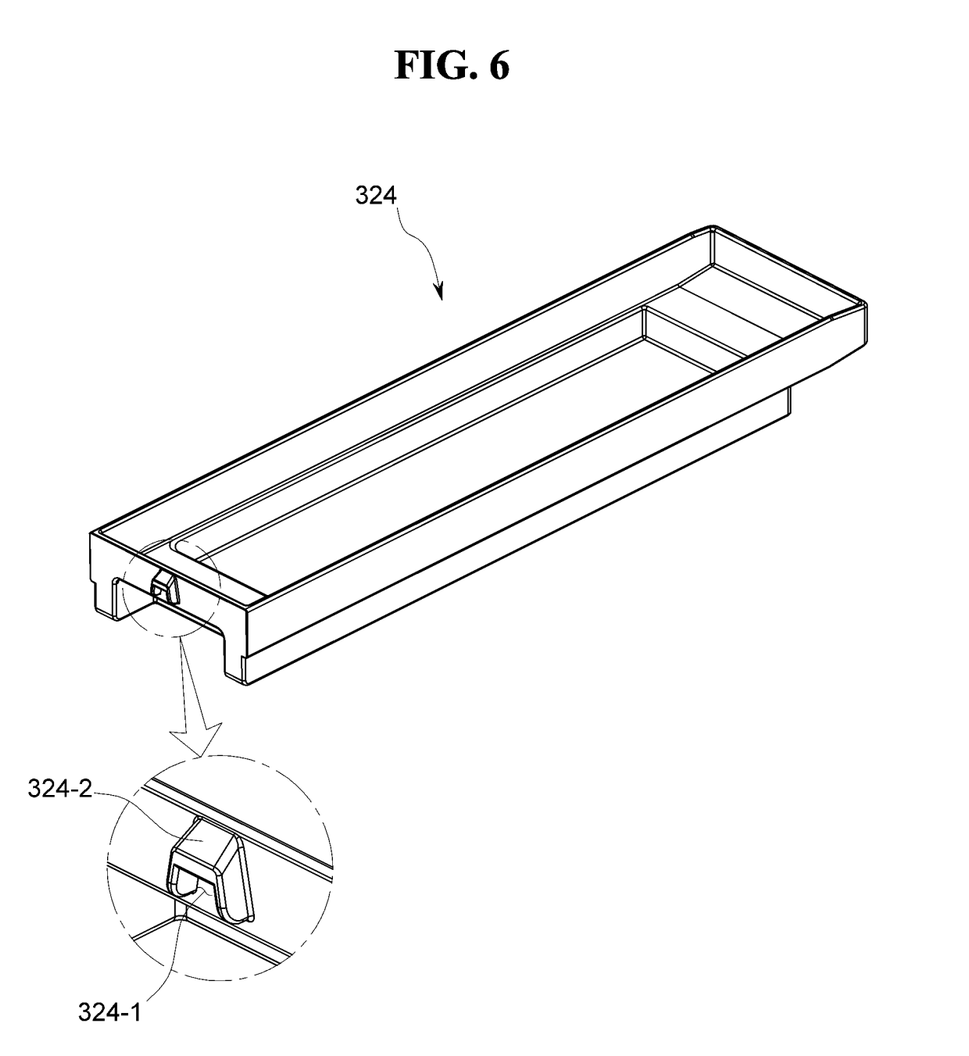

Referring to FIG. 6 together, the lifting fixing lever 60 has a fixing protrusion 612 protruding from a lower portion in a horizontal direction. Here, the lower portion of the lifting fixing lever 60 is more preferably wider than an upper portion to serve as a handle.

In addition, a protrusion 324-2 is formed on a front surface of the oil tray 324 accommodated in the lower case 31, and a lowering fixing groove 324-1 is formed in the rim of the protrusion 324-2.

A lower side of the protrusion 324-2 is preferably in the shape of a perforated square rim, so that the fixing protrusion 612 of the lifting fixing lever 60 in a lowered state is inserted into the lowering fixing groove 324-1 and the lifting fixing lever 60 is prevented from being operated in an upward direction.

Next, in order to lift the lifting frame 33, when a lower portion of the lifting fixing lever 60 is gripped and pulled, the lifting fixing lever 60 is rotated based on the rotating coupling portion 611 and restraining of the fixing protrusion 612 by the lowering fixing groove 324-1 is released.

Accordingly, the lifting frame 33 is in a state of being lifted by the lift unit 35.

Figure 7:
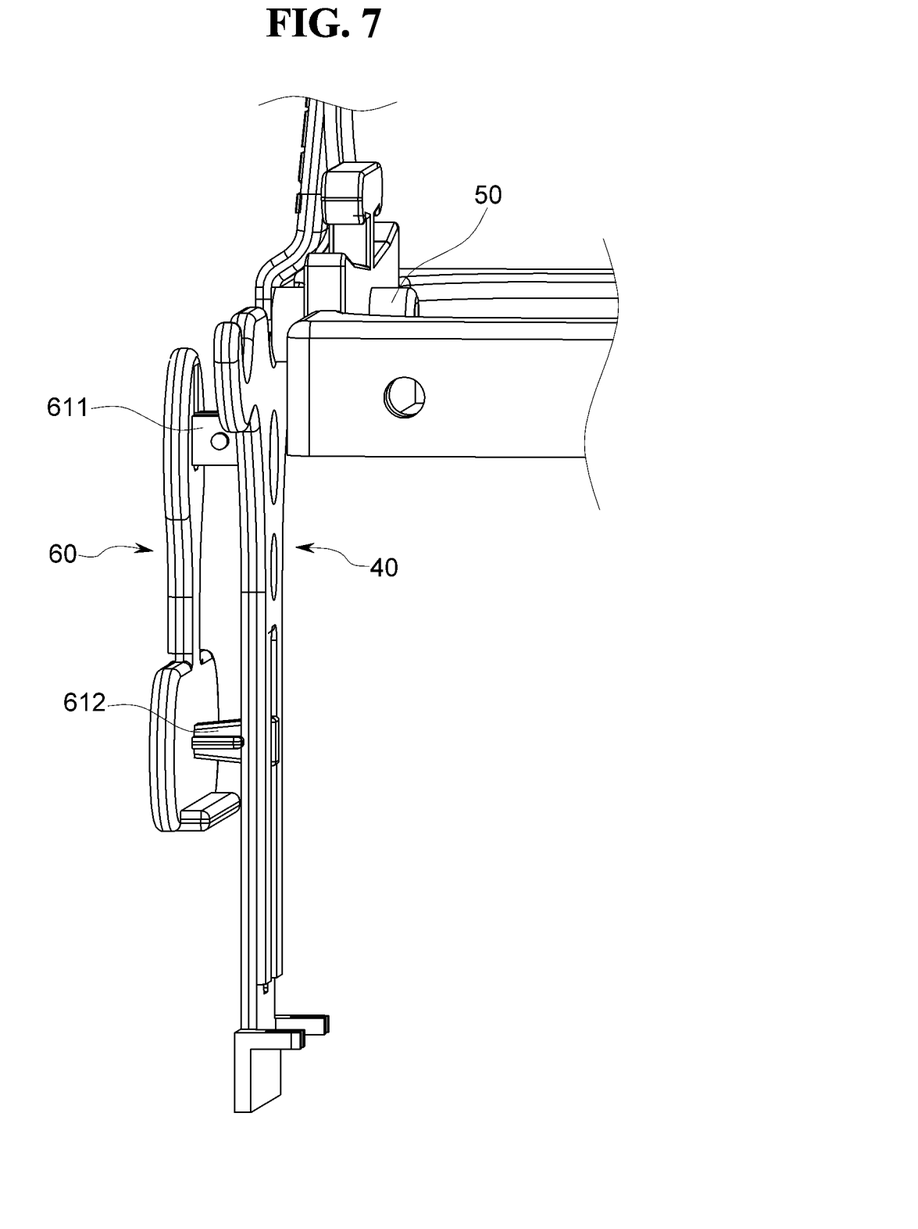
FIG. 7 is a partial view showing a lifted state of a portable direct-fired cooker of the present disclosure.
Figure 8:
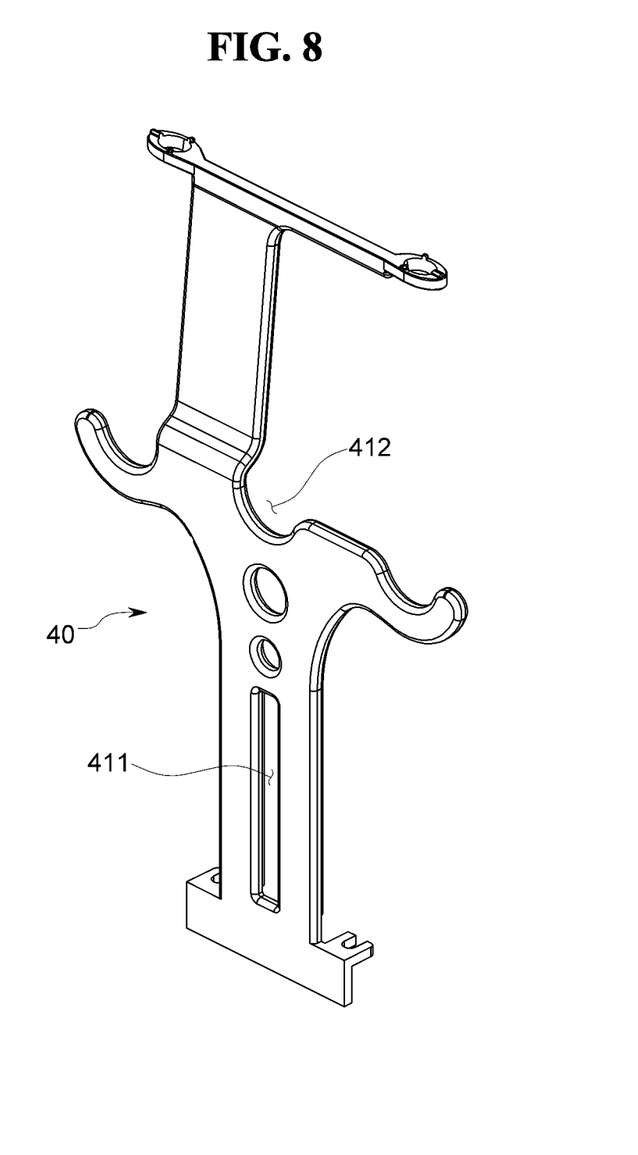
FIG. 8 is a view illustrating a component of the present disclosure.

FIG. 7 shows a state in which the lifting frame 33 is lifted. Referring to FIG. 8, the fixing protrusion 612 of the lifting fixing lever 60 lifted together with the lifting frame 33 is inserted into the guide groove 411 of the lifting guider 40, so that the lifting fixing lever 60 is prevented from being operated in a downward direction.

Meanwhile, the fixing protrusion 612 of the lifting fixing lever 60 is configured to increase in height toward an end, so that the fixing protrusion 612 may not be easily separated from a state in which the fixing protrusion 612 is inserted into the guide groove 411 or the lowering fixing groove 612, and in addition, in order to prevent excessive operation in the insertion direction, a stopper 612-1 shorter than a protruding length of the fixing protrusion 612 may be formed to protrude from the side of the fixing protrusion 612.

As described above, the portable direct-fired cooker of the present disclosure may improve the safety of the cooker by allowing the roasting plate to be smoothly lifted and lowered and stably maintaining the lifted and lowered state.

Although the embodiments of the present disclosure have been illustrated and described hereinabove, the present disclosure is not limited to the specific exemplary embodiments described above, but may be variously modified by those skilled in the art to which the present disclosure pertains without departing from the scope and spirit of the present disclosure as disclosed in the accompanying claims. These modifications should also be understood to fall within the scope of the present disclosure.

[Description of reference numerals]

| | |
|---|---|
| 1: gas supply unit | 12: adjustment valve |
| 13: first fixing hole | 14: second fixing hole |
| 15, 15': engagement hole | |
| 2: flame unit | 21: upper case |
| 23: thermal insulation container | 3: roasting unit |
| 31: lower case | 32: roasting plate |
| 321, 321': left and right plates | |
| 322: rib | 322': protruding piece |
| 34: support frame | 341, 341': hanger loop |
| 36: operating lever | 4: lid    5: handle |
| 353: spring | 354: spring cover |
| 33: lifting frame | |
| 35: gift unit | |
| 351, 351': support bracket | |

[Description of reference numerals] -continued

| | |
|---|---|
| 40: lifting guider | |
| 411: guide groove | 412: skew holder |
| 50: coupling unit | |
| 60: lifting fixing lever | |
| 611: rotating coupling portion | 612: fixing protrusion |
| 612-1: stopper | |
| 324: oil tray | |
| 324-1: lowering fixing groove | 324-2: protrusion |

The invention claimed is:

1. A portable direct-fired cooker comprising:
   a lower case supporting a roasting plate mounted at an upper portion thereof;
   an upper case spaced apart from the lower case and including a heater module emitting a flame ignited upon receiving gas toward the lower case;
   a lifting frame coupled to a lower surface of the roasting plate to support the roasting plate;
   a lift unit lifting and lowering the lifting frame;
   a lifting guider coupled to front surfaces of the upper case and the lower case and having a guide groove formed in a longitudinal direction;
   a lifting fixing lever having a rotation coupling portion protruding laterally from an upper portion thereof and penetrating through the guide groove; and
   a coupling unit penetrating through a front surface of the lifting frame and coupled to the rotation coupling portion of the lifting fixing lever,
   wherein the lifting fixing lever is rotatably coupled to the coupling unit, and
   wherein the lifting lever has a fixing protrusion protruding laterally from a lower portion thereof.

2. The portable direct-fired cooker of claim 1, wherein the lower portion of the lifting fixing lever is wider than the upper portion thereof.

3. The portable direct-fired cooker of claim 1, wherein the fixing protrusion is configured to be inserted into the guide groove of the lifting guider when the lift unit is lifted.

4. The portable direct-fired cooker of claim 1, further comprising:
   an oil tray accommodated in the lower case, having a protrusion in the shape of a rim formed on a front surface, and having a lowering fixing groove formed in the rim shape of the protrusion.

5. The portable direct-fired cooker of claim 4, wherein the fixing protrusion is configured to be inserted into the lowering fixing groove when the lift unit is lowered.

6. The portable direct-fired cooker of claim 5, wherein the fixing protrusion has a height increasing toward an end.

7. The portable direct-fired cooker of claim 6, wherein a stopper protrudes from the side of the fixing protrusion.

* * * * *